Patented Mar. 9, 1954

2,671,738

UNITED STATES PATENT OFFICE 2,671,738

DECORATIVE TRANSLUCENT PRODUCTS AND METHOD OF PREPARATION THEREOF

Daniel W. Klohs, Clifton, N. J., assignor to Sun Chemical Corporation, Long Island City, N. Y., a corporation of Delaware No Drawing. Application May 19, 1950,
Serial No. 163,093

12 Claims. (Cl. 117—76)

The present invention relates to the treatment of glass-fiber mats with pigmented resin-drying oil compositions, and to the product obtained thereby.

One object of the present invention is to provide a method for imparting novel decorative effects to glass-fiber mats.

Another object of the present invention is to provide a glass-fiber mat saturated with a pigmented resin-drying oil composition to provide a continuous unified film therein and which is characterized by variegated shades of color ranging from almost complete absence of pigment to complete pigment coverage.

Other objects of the present invention will be apparent from the following description and appended claims.

The development of glass fibers has greatly widened the field of use of glass and has led to the production of many new glass products. For example, continuous filaments or fibers of glass have been twisted and plied into yarns which, in turn, have been woven into textile materials. Such textile materials, due to the properties inherent in glass, are moisture resistant and fireproof and because of these qualities have supplanted the ordinary textile fabrics in many applications where such qualities are desired. Glass fibers have also found wide application as insulating wool, in which application long, fine fibers of glass are usually formed into a compact, soft, resilient mass which is generally employed in the form of a continuous blanket from perhaps one to several inches in thickness. Preformed insulating boards of various thicknesses and of varying degrees of flexibility and rigidity have also been prepared from glass fibers by adding a small amount of a thermosetting resin to glass wool and then compressing the whole to the desired thickness while curing the resin.

A further development in the manufacture of glass-fiber products has been the production, by the Owens-Corning Fiberglas Corporation, of glass-fiber mats. These mats are usually produced in the form of continuous sheets of long fine glass fibers, which are interlaced and cemented together with any of several types of binding agents. Binding agents which have satisfactorily been employed for such purposes are starch, phenol-formaldehyde resins and furfural formaldehyde resins. The glass-fiber mats are made in thicknesses ranging from .01 to .10 inch in thickness, and while relatively thin, flexible, and porous in construction, have excellent uniformity of thickness. Due to the very construction of these products, the mats act as good carriers or reinforcing agents for various types of coating compositions. Thus, for example, by the simple process of dip application, that is, by immersing the glass mat in a suitable coating composition and thereafter removing any excess pick-up, a product may be obtained wherein a continuous, unified film of the impregnant is carried in and upon the glass mat. By treating a glass-fiber mat in such manner with a suitable coating composition containing a thermosetting resin base and thereafter curing the impregnated product, a glass mat may be obtained which is substantially non-porous and which is flexibly rigid; that is, the treated product has acquired a certain degree of stiffness or rigidity, but which is such as to permit the sheet to be bent or flexed to a certain degree. By controlling the amount of pick-up of the impregnating composition by the glass mat and thereby controlling the thickness of film contained within the structure of the glass-fiber mat, varying degrees of flexibility and rigidity may be obtained. Colored glass-fiber mats may also be obtained by incorporating a pigment of the desired color in the impregnating composition before treatment of the mat therewith, the continuous resinous film of the impregnant serving as a binder for the dispersed pigment with the glass fibers and providing a product of uniform shade and color. Since the resinous film of the impregnant in these products is relatively thin and since the material which acts as a base or reinforcement for the said film is composed of glass, the impregnated products, even when colored with a pigment, transmit light and thus lend themselves to applications wherein decorative effects as well as utility, are desired. For example, these products may be employed as shades for lamps and as decorative wall panelling. By permitting light to shine therethrough, novel and pleasing decorative effects may be obtained.

However, heretofore in the treatment of glass-fiber mats with colored coating compositions in the manner above outlined, coated glass-fiber mats of a single, uniform, solid color only have been obtained. It has not previously been possible to impart other decorative effects such, for example, as two-toned color effects, or to impart a sort of a marble effect to the finished product without further processing the impregnated glass-fiber mat. By the present invention there are provided glass-fiber mats, uniformly impregnated with a pigmented resin-base composition to provide a continuous unified film of impregnant therein, and characterized by a pattern of variegated shades of color ranging from almost complete absence of pigment to the solid shade of the pigment utilized. And strangely enough, such novel decorative effects are provided by treating the glass-fiber mats with a uniformly pigmented resin-base composition in the same manner in which a solid color would ordinarily be provided. That is, such color effects are imparted to the glass-fiber mat in the same operation in which the mat is impregnated with the resin-base impregnating composition.

The treatment by which the novel products of the present invention are obtained consist in the ordinary and commonly known method of dip application, as mentioned hereinbefore. The glass-fiber mat, usually in the form of a continuous sheet, is fed into a bath containing the pigmented resin-base composition where the mat, due to its porous nature, becomes saturated with the said composition. The impregnated mat is then led between squeeze rollers wherein the excess of impregnant is squeezed out of the mat and the amount of pick-up controlled. Thereafter the impregnated mat is fed through drying ovens, or is hung in a drying tower wherein it is subjected to elevated temperatures for a certain length of time to effect drying and setting of the coating. With the impregnating compositions of the present invention, as hereinafter set out, a drying temperature of approximately 270°–300° F. for approximately 15–20 minutes will satisfactorily dry the impregnated mat. It has been found that an amount of pick-up of the impregnating composition by the glass-fiber mat within the range of approximately 10–20 ounces of the said composition per square yard of mat, based upon the dry weight of the composition, is sufficient to completely permeate and fill the porous structure of the mat to provide a continuous, unified, homogeneous film of impregnant therein and which is not present in such excess as to completely cover the surface of the mat to conceal the identity of the glass-fiber structure itself.

Ordinarily in such treatment, with the various resinous compositions heretofore employed, such as lacquers and organosols in which the resins are in solution or in suspension in the solvents and diluents customarily employed, an impregnated product having a single solid color has been obtained as would be expected. However, by employing the pigmented compositions of the present invention in the treatment of a glass-fiber mat such as is hereinbefore described, a glass-fiber mat impregnated with a continuous unified film of a resin-base composition and possessing the novel decorative effects set forth above is obtained. The impregnated mats are characterized by varied shades and hues of the particular pigment employed in the impregnating composition, and such hues are dispersed and intermingled in the finished product much as are the colors in marble. Basically the finished mats display an irregular two-toned pattern of a single color; however, in many instances, the finished mat will not only present the appearance of varied shades of a single color, but will rather give the appearance of two separate and distinct colors even though the impregnant thereof is one which has dispersed therein a pigment of only one color and shade. Also in many cases, the impregnated glass-fiber mat, besides exhibiting the various shades of color mentioned, has a bronze undertone, which in light reflected from the surface thereof gives the finished mat the appearance of being flecked with minute gold or shiny copper particles. Thus by the present invention, not only is there provided a simple method of imparting novel, decorative, and pleasing effects to glass-fiber mats, but there are also provided products in which such decorative effects are an integral part of a single, unified, and continuous film of binder.

The pigmented resin-base compositions which, when applied to the glass-fiber mats above mentioned, provide products having the characteristics and properties set forth above, comprise as an essential ingredient a varnish containing a drying oil and an oil-soluble rosin-phenol-formaldehyde resinous condensation product. Generally, any of the commonly known drying oils such as China-wood oil, linseed oil, oiticica oil, etc., may be employed to prepare the varnish. As an example of a resin of the type mentioned which is employed with the drying oil to form the said varnish, there may be mentioned Amberol F-7, which is a rosin-modified phenol-formaldehyde resin manufactured and sold by the Resinous Products Division of Rohm & Haas Company. Additionally, there is included in the impregnating composition a solvent-thinner which is compatible with the said varnish. By the use of a solvent-thinner, the viscosity of the impregnating composition and the varnish content thereof may be varied and controlled as desired. The solvent-thinner employed may be either an aliphatic hydrocarbon solvent or an aromatic hydrocarbon solvent having a boiling point within the range of approximately 100–250° C. Suitable solvent-thinners which may be employed in the present invention are mineral spirits, toluene, xylene, light solvent naphtha, and hi-flash naphtha. It is desirable in the finished composition that the varnish constituent comprise no more than approximately 75% by weight of the vehicle and also that it be not less than approximately 62.5% thereof. Therefore, the solvent-thinner is incorporated into the varnish, or into the impregnating composition, in an amount within the range of approximately 25% to approximately 37.5% by weight based upon the combined weight of the varnish and thinner.

In addition to the varnish, there are included in the impregnating compositions of the present invention an insoluble pigment, and a drier material soluble in the said varnish. The pigment employed may be either a dry color or a paste color. By the latter term are meant pigments which have previously been dispersed in a suitable vehicle to provide a concentrated pigment paste which is compatible with the varnish employed in the present invention, and which may be dispersed in the said varnish by the mere expedient of adding the pigment paste thereto and stirring until a homogeneous dispersion is obtained. For best results, the pigment content of the impregnating composition should satisfactorily be not greater than approximately 4.5% by weight of pigment, based upon 100 parts by weight of the varnish and thinner. While greater percentages of pigment may be employed, such amounts of pigment have a tendency to increase the viscosity of the impregnating compositions to an undesirable operating consistency. Also when too great an amount of pigment of a dark shade is employed, the effective contrast of the varied shades of color in the finished product is substantially diminished. As driers for the impregnating compositions there may be employed the cobalt, zinc, and manganese salts of naphthenic, linoleic, oleic and the resinic acids. Lead salts, such as lead acetate, may also be employed.

*Example 1*

In the preparation of a varnish employed in the present invention, 506 parts by weight of China-wood oil and 480 parts by weight of a rosin-modified phenol-formaldehyde oil-soluble resin are cooked together in a suitable vessel, the heating being conducted in such manner that the oil-resin mixture attains a temperature of approximately 550° F. in approximately 35 minutes. At the end of this period, a mixture of 169 parts by weight of China-wood oil and 77 parts by weight of linseed oil is added to the hot varnish to check the temperature of the cook, the said temperature upon such addition generally dropping to the neighborhood of approximately 470° F. The varnish is then allowed to cool to a temperature of approximately 370° F., at which point 33 parts by weight of lead acetate, 122.4 parts by weight of xylene and 288.2 parts by weight of mineral spirits are added thereto. There is thus formed a vehicle which comprises approximately 75% by weight of a varnish having a resin content of approximately 39% by weight based upon the weight of the varnish, and approximately 25% by weight of solvent-thinners. The composition thus obtained, with the addition of pigment and additional drier materials, may be employed as the impregnating composition for the glass-fiber mats. Additional solvent-thinner may be incorporated therein as set out above.

Example 2

400 parts by weight of China-wood oil and 385 parts of an oil-soluble rosin-modified phenol-formaldehyde resinous condensation product are heated together in the manner outlined in Example 1. At the end of the cook period, a mixture of 215 parts by weight of China-wood oil and 100 parts by weight of linseed oil is added to the hot varnish to check the temperature rise of the cook. Following the addition of the oil-mixture to the hot varnish, there are then added thereto 28.6 parts by weight of lead acetate, and 366.6 parts by weight of mineral spirits. The vehicle thus formed comprises a varnish having a resin content of approximately 35% by weight based upon the weight of the varnish, and approximately 25% by weight of solvent thinners.

Illustrative of the pigmented resin-base impregnating compositions of the present invention are the following examples.

Example 3

| | Parts by weight |
|---|---|
| Vehicle of Example 1 | 100 |
| Cobalt naphthenate | 2 |
| Red pigment paste consisting of: | |
|   Barium lithol red pigment_____25% by wt. | |
|   Calcium carbonate_____8% by wt. | 1 |
|   Glyceryl-phthalate resin_____15% by wt. | |
|   Petroleum aromatic solvent (boiling range 340–540° F.)_____52% by wt. | |
| | 103 |

A starch-bonded glass-fiber mat having a thickness of approximately 0.015 inch was impregnated with the composition of Example 2 in the amount of approximately 10 ounces per square yard of the mat based on the dry weight of the impregnant and thereafter dried by heating. The glass-fiber mat was completely permeated with a unified film of impregnant and was characterized by a pattern of variegated shades of red colors.

Example 4

| | Parts by weight |
|---|---|
| Vehicle of Example 1 | 100 |
| Cobalt naphthenate | 2 |
| Xylene | 15 |
| Green pigment paste consisting of: | |
|   Phthalocyanine green pigment____25% by wt. | |
|   Calcium carbonate_____8% by wt. | 2 |
|   Glyceryl-phthalate resin_____15% by wt. | |
|   Petroleum aromatic solvent (boiling range 340–540° F.)_____52% by wt. | |
| | 119 |

A phenol-formaldehyde resin-bonded glass-fiber mat having a thickness of approximately 0.015 inch and impregnated with the composition of Example 4 in the amount of approximately 20 ounces per square yard of the mat based on the dry weight of the impregnant was characterized by a pattern of light green and dark green colors irregularly intermingled and by a bronze colored undertone.

Example 5

| | Parts by weight |
|---|---|
| Vehicle of Example 1 | 100 |
| Manganese naphthenate | 4 |
| Toluene | 20 |
| Blue pigment paste consisting of: | |
|   Ultramarine blue pigment_____50% by wt. | |
|   Calcium carbonate_____20% by wt. | 4 |
|   Glyceryl-phthalate resin_____10% by wt. | |
|   Petroleum aromatic solvent (boiling range 340–540° F.)_____20% by wt. | |
| | 128 |

A furfural-formaldehyde resin-bonded glass-fiber mat having a thickness of approximately 0.02 inch and impregnated with the composition of Example 5 in the amount of approximately 15 ounces per square yard of the mat based on the dry weight of the impregnant presented a pattern of light and dark blue colors irregularly dispersed throughout the mat.

Similar products consisting of glass-fiber mats having a unified and homogeneous film of impregnant therein and displaying the pattern of variegated shades of color characteristic of the products of the present invention were obtained by impregnating the starch and resin-bonded glass-fiber mats with the compositions of each of the following illustrative examples in accordance with the procedure hereinbefore outlined.

Example 6

| | Parts by weight |
|---|---|
| Vehicle of Example 1 | 100 |
| Cobalt naphthenate | 0.75 |
| Xylene | 20 |
| Yellow pigment paste consisting of: | |
|   Chrome yellow pigment_____75% by wt. | |
|   Calcium stearate_____1% by wt. | 6 |
|   Glyceryl-phthalate resin_____7% by wt. | |
|   Petroleum aromatic solvent (boiling range 340–540° F.)_____17% by wt. | |
| | 126.75 |

Example 7

| | Parts by weight |
|---|---|
| Vehicle of Example 1 | 100 |
| Zinc naphthenate | 2 |
| Hi-flash naphtha | 20 |
| Barium lithol red pigment | 2 |
| | 124 |

Example 8

| | Parts by weight |
|---|---|
| Vehicle of Example 2 | 100 |
| Cobalt naphthenate | 1 |
| Mineral spirits | 5 |
| Ultramarine blue pigment | 4 |
| | 110 |

Example 9

| | Parts by weight |
|---|---|
| Vehicle of Example 2 | 100 |
| Cobalt naphthenate | 2 |
| Mineral spirits | 15 |
| Chrome yellow pigment | 4.5 |
| | 121.5 |

Other resinous material may be added to the impregnating compositions above described without affecting the novel decorative effects imparted to the glass-fiber mats. For example, to harden the finish of the impregnant, a butylated melamine-formaldehyde resin or a butylated urea-formaldehyde resin may be added to the pigmented compositions of Examples 2 to 8 in a ratio of as much as 16 parts by weight of resin solids to 100 parts by weight of the impregnating composition. Such resinous materials are usually prepared and sold as a solution of the resin in a suitable solvent or mixture of solvents therefor. One such resin which may be employed is Uformite F-240, a butylated urea-formaldehyde resin, manufactured and sold by the Resinous Products Division of Rohm & Haas Chemical Company in the form of a 60% resin solution in hi-flash naphtha.

Just why it is that such novel effects are obtained by treating the starch-bonded and resin-bonded glass-fiber mats with the pigmented resin-base compositions of the present invention is not known for certain. Apparently, some sort of selective absorption is exercised by the glass-fiber mats upon the impregnating compositions which prevents the even distribution therein of the pigment contained in the impregnant. This is evident from the fact that such selective absorption also occurs when the glass mats are treated with resin-base vehicles of the present invention in which the pigment material has been omitted. In such cases, the two-toned effect is apparent but is not as contrasting nor as striking as when pigments are included in the impregnating vehicles. From this can be seen that the selective absorption of the vehicle by the glass mat is unaffected by the addition of a pigment to the vehicle, and in fact governs the distribution or dispersion of the pigment within the resin film formed within the structure of the glass-fiber mat. However, whatever selective absorbing action may exist as between the glass-fiber mat and the impregnating composition which prevents the even or uniform distribution of pigment throughout the applied resinous film, it has no effect upon the uniformity or upon the completeness of the impregnation itself. That is, the glass-fiber mat is thoroughly and completely impregnated with the said impregnating composition to provide a glass-fiber mat containing a homogeneous and unified coating or film of impregnant therein.

While the above products and processes of making the same constitute preferred embodiments of the present invention, changes may be made therein without departing from the scope of the invention as defined in the appended claims.

What is claimed is:

1. A glass fiber mat characterized by a pattern of variegated shades of color ranging from almost complete absence of pigment to complete pigment coverage consisting of a glass fiber mat having a structure of interlaced glass fibers bonded together with starch and containing within its structure a homogeneous, unified, pigmented film of an impregnating composition which permeates and fills the structure of said glass fiber mat without concealing the surface structure of said glass fiber mat, said impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of a liquid hydrocarbon having a boiling point within the range of approximately 100-250° C.

2. A glass fiber mat characterized by a pattern of variegated shades of color ranging from almost complete absence of pigment to complete pigment coverage consisting of a glass fiber mat having a structure of interlaced glass fibers bonded together with starch and containing within its structure a homogeneous, unified, pigmented film of an impregnating composition which permeates and fills the structure of said glass fiber mat without concealing the surface structure of said glass fiber mat, said impregnating composition comprising not more than approximately 4.5% by weight of pigment, approximately 75 parts by weight of a varnish comprising a rosin-modified phenol-formaldehyde resinous condensation product and China-wood oil, and approximately 25 to 37.5 parts by weight of a liquid hydrocarbon having a boiling point within the range of approximately 100-250° C.

3. A glass fiber mat characterized by a pattern of variegated shades of color ranging from almost complete absence of pigment to complete pigment coverage consisting of a glass fiber mat having a structure of interlaced glass fibers bonded together with starch and containing within its structure a homogeneous, unified, pigmented film of an impregnating composition which permeates and fills the structure of said glass fiber mat without concealing the surface structure of said glass fiber mat, said impregnating composition comprising not more than approximately 4.5% by weight of pigment, approximately 75 parts by weight of a varnish comprising a rosin-modified phenol-formaldehyde resinous condensation product and linseed oil, and approximately 25 to 37.5 parts by weight of a liquid hydrocarbon having a boiling point within the range of approximately 100-250° C.

4. A glass fiber mat characterized by a pattern of variegated shades of color ranging from almost complete absence of pigment to complete pigment coverage consisting of a glass fiber mat having a structure of interlaced glass fibers bonded together with starch and containing within its structure a homogeneous, unified, pigmented film of an impregnating composition which permeates and fills the structure of said glass fiber mat without concealing the surface structure of said glass fiber mat, said impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of xylene.

5. A glass fiber mat characterized by a pattern of variegated shades of color ranging from almost complete absence of pigment to complete pigment coverage consisting of a glass fiber mat having a structure of interlaced glass fibers bonded together with starch and containing within its structure a homogeneous, unified, pigmented film of an impregnating composition which permeates and fills the structure of said glass fiber mat without concealing the surface structure of said glass fiber mat, said impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of toluene.

6. A glass fiber mat characterized by a pattern of variegated shades of color ranging from almost complete absence of pigment to complete pigment coverage consisting of a glass fiber mat having a structure of interlaced glass fibers bonded together with starch and containing within its structure a homogeneous, unified, pigmented film of an impregnating composition which permeates and fills the structure of said glass fiber mat without concealing the surface structure of said glass fiber mat, said impregnating composition comprising not more than approximately 4.5% by weight of a varnish comprising a rosin-modified phenol-formaldehyde resinous condensation product and a drying oil, and approximately 25 to 37.5 parts by weight of mineral spirits.

7. A method of treating a glass fiber mat to provide a product having a homogeneous and unified film of a pigmented resin-base impregnant therein and characterized by a pattern of variegated shades of color ranging from almost complete absence of pigment to complete pigment coverage which comprises impregnating a glass fiber mat having a substantially porous structure of interlaced fibers bonded together with starch with an impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of a liquid hydrocarbon having a boiling point within the range of approximately 100-250° C., removing such excess of said impregnating composition as to reveal the surface structure of said glass fiber mat, and thereafter heating said impregnated glass fiber mat at elevated temperatures to effect drying and setting of the said impregnating composition.

8. A method of treating a glass fiber mat to provide a product having a homogeneous and unified film of a pigmented resin-base impregnant therein and characterized by a pattern of variegated shades of color ranging from almost complete absence of pigment to complete pigment coverage which comprises impregnating a glass fiber mat having a substantially porous structure of interlaced fibers bonded together with starch with an impregnating composition comprising not more than approximately 4.5% by weight of pigment, approximately 75 parts by weight of a varnish comprising a rosin-modified phenol-formaldehyde resinous condensation product and China-wood oil, and approximately 25 to 37.5 parts by weight of a liquid hydrocarbon having a boiling point within the range of approximately 100-250° C., removing such excess of said impregnating composition as to reveal the surface structure of said glass fiber mat, and thereafter heating said impregnated glass fiber mat at elevated temperatures to effect drying and setting of the said impregnating composition.

9. A method of treating a glass fiber mat to provide a product having a homogeneous and unified film of a pigmented resin-base impregnant therein and characterized by a pattern of variegated shades of color ranging from almost complete absence of pigment to complete pigment coverage which comprises impregnating a glass fiber mat having a substantially porous structure of interlaced fibers bonded together with starch with an impregnating composition comprising not more than approximately 4.5% by weight of pigment, approximately 75 parts by weight of a varnish comprising a rosin-modified phenol-formaldehyde resinous condensation product and linseed oil, and approximately 25 to 37.5 parts by weight of a liquid hydrocarbon having a boiling point within the range of approximately 100-250° C., removing such excess of said impregnating composition as to reveal the surface structure of said glass fiber mat, and thereafter heating said impregnated glass fiber mat at elevated temperatures to effect drying and setting of the said impregnating composition.

10. A method of treating a glass fiber mat to provide a product having a homogeneous and unified film of a pigmented resin-base impregnant therein and characterized by a pattern of variegated shades of color ranging from almost complete absence of pigment to complete pigment coverage which comprises impregnating a glass fiber mat having a substantially porous structure of interlaced fibers bonded together with starch with an impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of xylene, removing such excess of said impregnating composition as to reveal the surface structure of said glass fiber mat, and thereafter heating said impregnated glass fiber mat at elevated temperatures to effect drying and setting of the said impregnating composition.

11. A method of treating a glass fiber mat to provide a product having a homogeneous and unified film of a pigmented resin-base impregnant therein and characterized by a pattern of variegated shades of color ranging from almost complete absence of pigment to complete pigment coverage which comprises impregnating a glass fiber mat having a substantially porous structure of interlaced fibers bonded together with starch with an impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of toluene, removing such excess of said impregnating composition as to reveal the surface structure of said glass fiber mat, and thereafter heating said impregnated glass fiber mat at elevated temperatures to effect drying and setting of the said impregnating composition.

12. A method of treating a glass fiber mat to provide a product having a homogeneous and unified film of a pigmented resin-base impregnant therein and characterized by a pattern of variegated shades of color ranging from almost complete absence of pigment to complete pigment coverage which comprises impregnating a glass fiber mat having a substantially porous structure of interlaced fibers bonded together with starch with an impregnating composition comprising not more than approximately 4.5% by weight of pigment, approximately 75 parts by weight of a varnish comprising a rosin-modified phenol-formaldehyde resinous condensation product and a drying oil, and approximately 25 to 37.5 parts by weight of mineral spirits, removing such excess of said impregnating composition as to reveal the surface structure of said glass fiber mat, and thereafter heating said impregnated glass fiber mat at elevated temperatures to effect drying and setting of the said impregnating composition.

DANIEL W. KLOHS.

References Cited in the file of this patent

UNITED STATES PATENTS

| Number | Name | Date |
| --- | --- | --- |
| 1,950,417 | Root | Mar. 13, 1934 |
| 2,204,859 | Hyatt et al. | June 18, 1940 |
| 2,302,176 | Bradley | Nov. 17, 1942 |
| 2,306,347 | Slayter | Dec. 22, 1942 |
| 2,446,119 | White et al. | July 27, 1948 |